United States Patent
Watanabe et al.

(10) Patent No.: US 6,441,912 B1
(45) Date of Patent: Aug. 27, 2002

(54) CHARACTER DISPLAY APPARATUS AND CHARACTER INPUT APPARATUS

(75) Inventors: Kenji Watanabe, Tokyo (JP); Takuya Suetani, Tokyo (JP); Kiyoshi Ogawa, Tokyo (JP); Miwa Kanda, Tokyo (JP); Teruhiko Unno, Suwa (JP); Hiroshi Kobayashi, Suwa (JP); Hideyuki Tsukuda, Suwa (JP); Shigeyuki Kurebayashi, Suwa (JP)

(73) Assignees: King Jim Co., Ltd. (JP); Seiko Epson Corporation (JP)

( * ) Notice: Subject to any disclaimer, the term of this patent is extended or adjusted under 35 U.S.C. 154(b) by 0 days.

(21) Appl. No.: 09/253,066

(22) Filed: Feb. 19, 1999

(30) Foreign Application Priority Data

Mar. 19, 1998 (JP) .............................. 10-069690

(51) Int. Cl.[7] .............................................. G06K 15/00
(52) U.S. Cl. ...................................... 358/1.11; 358/1.1
(58) Field of Search ................................. 358/1.11, 1.1, 358/1.12, 1.9, 447, 452; 400/83, 63; 382/176, 177, 170, 171, 173, 286, 309; 345/467, 468, 469; 707/530, 531

(56) References Cited

U.S. PATENT DOCUMENTS

| 4,212,011 A | 7/1980 | Waldron ...................... 340/784 |
| 5,813,021 A | 9/1998 | Toyosawa et al. .......... 707/531 |

FOREIGN PATENT DOCUMENTS

| JP | 7195790 | 8/1995 |
| WO | 600593 | 6/1993 |

Primary Examiner—Arthur G. Evans
(74) Attorney, Agent, or Firm—Lorusso & Loud

(57) ABSTRACT

The character display apparatus according to the present invention has a constitution including (1) character display means having at least a character segment in the shape of a character, and a background segment provided around the character segment and constituting a background of an outline character; and (2) display control means for performing on-off control of the character segment and the background segment, which constitute the character display means.

9 Claims, 7 Drawing Sheets

FIG.4A1
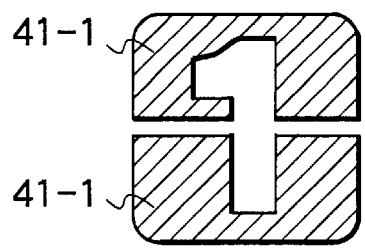
FIG.4A2
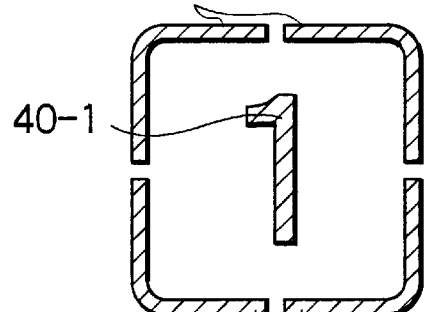
FIG.4B1
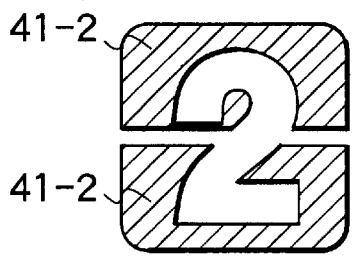
FIG.4B2
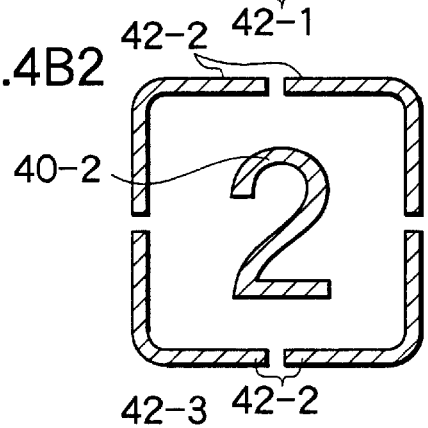
FIG.4C1
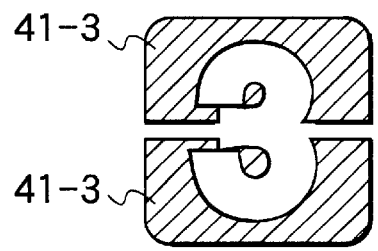
FIG.4C2
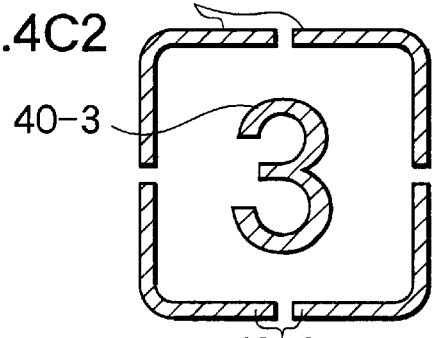
FIG.4D1
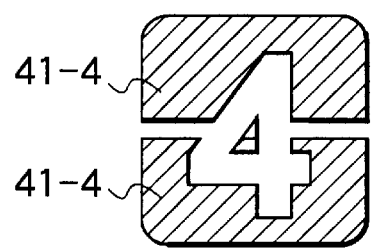
FIG.4D2
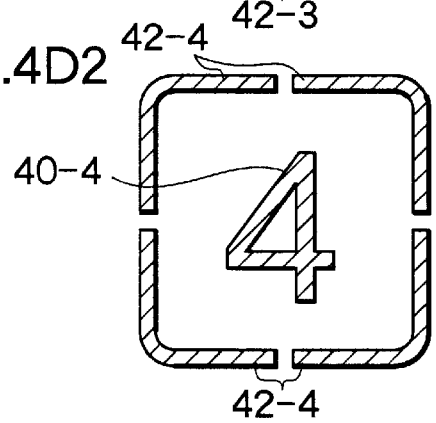

FIG.6

| | DISPLAYING MANNER OF LINE NUMBER INDICATOR | MEANING OF DISPLAYING MANNER |
|---|---|---|
| (1) | NEGATIVE LIGHT-ON DISPLAY STATE | INDICATED LINE IS NOT DISPLAY LINE AND CONTAINS DETERMINED CHARACTER. |
| (2) | NEGATIVE BLINKING DISPLAY STATE | INDICATED LINE IS DISPLAY LINE AND CONTAINS DETERMINED CHARACTER. |
| (3) | POSITIVE LIGHT-ON DISPLAY STATE | INDICATED LINE IS NOT DISPLAY LINE. INDICATED AND SUBSEQUENT LINES CONTAIN NO DETERMINED CHARACTER. |
| (4) | POSITIVE BLINKING DISPLAY STATE | INDICATED LINE IS DISPLAY LINE. INDICATED AND SUBSEQUENT LINES CONTAIN NO DETERMINED CHARACTER. |
| (5) | LIGHT-OFF DISPLAY STATE | INDICATED LINE DOES NOT CONSTITUTE INPUT CHARACTER STRING. |
| (6) | NEGATIVE-POSITIVE BLINKING DISPLAY STATE | NOT USED IN THE EMBODIMENT. |

CHARACTER DISPLAY APPARATUS AND CHARACTER INPUT APPARATUS

BACKGROUND OF THE INVENTION

1. Field of the Invention

The present invention relates to a character display apparatus and to a character input apparatus. The present invention is applicable to an apparatus having a display unit in which each of the number of lines and a number of characters in each line is limited to a small value, such as a tape printing apparatus and a seal making apparatus.

2. Discussion of the Related Art

In a tape printing apparatus, inputted characters (the term "character" includes letter, symbol, pictograph, pattern, and the like throughout the specification and the appended claims) are printed on a tape in the form of a string (hereinafter a string of characters will be referred to as "character string", an inputted character as "input character", and inputted character string as "input character string"), and the tape carrying such a printed character string is discharged and then cut into several portions. Each of the portions of the tape thus obtained is called "label".

Unlike in an ordinary word processor, in such a tape printing apparatus, since the printed resultant is a label and printing is performed on a tape in which limitation is imposed on the dimension in the transversal direction, the number of printed lines is limited by the apparatus itself. Further, in such a tape printing apparatus, since the number of characters in each line depends on cases, it is not realistic to constitute a display unit capable of displaying all the characters of a possible maximum allowable number at one time with respect to each line.

In view of the foregoing, in a tape printing apparatus, as a display unit for displaying input character string, a small-size display unit (e.g., a small-size liquid crystal display) which is adapted to display a small number of lines and a small number of characters in each line has been employed. In such a conventional small-size display unit, it is common that the number of display lines is determined to a value smaller than the maximum printable line number (e.g., four lines and eight lines) within the maximum tape width and that the number of characters in each line is determined to a value around five (e.g., six).

Accordingly, in the conventional display unit, in some cases, the number of input character string becomes larger than that of the number of lines which the display apparatus can display. In such cases, it is necessary to indicate which lines of the input character string is currently displayed. In the conventional apparatus, such indication is conducted by the following manner.

FIG. 2 shows a display surface 1 of a display unit in a tape printing apparatus in which print allowable maximum line number (the term "print allowable maximum line number" as used herein means the maximum number of lines which can be printed) is four, and the display allowable line number is one. As shown in FIG. 2, the display surface 1 has a character display area 2 which is adapted to display an input character string, and line number indicators 3-1 to 3-4 disposed at the left side portion of the display surface 1 along the top-to-bottom direction.

Each of the indicators 3-1 to 3-4 carries thereon a numeral representing a line number in the input character string, and shows an input state and/or a display state of each line constituting the character string by assuming a blinking display state, a light-on display state, or a light-off display state.

More particularly, when an indicator assumes the blinking state (hereinafter, an indicator assuming a blinking state will be often referred to as "a blinking indicator"), the blinking indicator indicates that the line of the line number denoted by the numeral applied on the blinking indicator is currently displayed in the character display area 2. If the character display area 2 is of the type that two or more lines are displayed, only an indicator carrying the numeral indicative of the line number of the line at which the cursor stays among the display lines assumes a blinking state.

When an indicator assumes the light-on display state (hereinafter, an indicator assuming a light-on display state will be often referred to as "light-on indicator"), the light-on indicator indicates that the line of the line number denoted by the numeral applied on the light-on indicator exists in the input character string. It should be noted that, among the lines existing in the input character string, the cursor attached display line is denoted by a blinking indicator as described above, and therefore the cursor attached display line is excluded from the object to be displayed in the lighting-on display state. This implies that, when the character display area is of the type that two or more lines are displayed, only the line (or lines) which is (or are) not attached with the cursor is (or are) indicated by a light-on indicator. It should be noted that the line indicated by the light-on indicator includes not only a substantial line but also a null line, both of which will be defined later.

When an indicator assumes the light-off display state (hereinafter, an indicator assuming a light-off display state will be often referred to as "light-off indicator"), the light-off indicator indicates that the line indicated by the light-off indicator does not exist in the input character string. That is, the line indicated by the light-off indicator is neither the substantial line nor the null line.

The character display area 2 is an area for displaying characters. As the display method for the character display area 2, the dot display method (which is often called as "dot representation" or "matrix method") is employed in which a character is displayed by turning on or off each of the dot segments arranged vertically and laterally. In contrast, each of the line number indicators 3-1 to 3-4 is adapted to display a specific fixed numeral, and is constituted by approximately one or two segments each of which is turned on or off so as to display a predetermined fixed number. As is known from the above description, the indicator of this type is different in constitution and function from a general numeral displaying indicator which is constituted by seven segments arranged in the shape of a numeral "8".

In FIG. 2, the outline character "1" displayed in the character display area 2 is a line head mark 2M representing that the character displayed subsequent to the line head mark 2M is the head of the display line. The line head mark 2M is not displayed when the forefront character (in the case of the present embodiment, the leftmost character in the display area) of the displayed characters is not the forefront character of the display line. For example, assuming that the allowable display character number is five and the number of the input characters is seven, if the five characters displayed in the character display area are the second to sixth characters, the line head mark 2M is not displayed because the forefront character displayed in the character display area is not the forefront character of the display line.

As described above, in the conventional tape printing apparatus, since the line number indicator is provided, the user can know, even when the number of lines of the input character is larger than the display allowable line number, which line is present or absent and which line is currently inputted.

Meanwhile, if the tape printing apparatus is so constituted as to be capable of providing information which cannot be read from the displayed manner of the characters of the input character string as much as possible, the usability of the character printing apparatus is enhanced.

For example, there is an attribute indicative of whether the line is a substantial line or a null line. The term "substantial line" as used herein refers to a line which substantially constitutes a character regardless of whether or not the line contains a character. The term "null line" as used herein refers to a line meeting conditions that no character is inputted and the slewing operation is conducted in a line and that the subsequent lines contains no determined character. If the tape printing apparatus can indicate whether the display line is a substantial line or a null line as a line attribute, the user can easily know, even when the display line is changed from a substantial line to a null line, whether or not the null line is successfully accepted by the tape printing apparatus.

However, the displaying manners of the line number indicators are limited to three manners: blinking display state (that is, display and non-display of outline numeral appear in a repeated manner), light-on display state (that is, outline numeral is displayed), and light-off display state, so that four or more attributes or the like cannot be displayed. Due to this limitation, in the conventional printing apparatus, it is impossible to causes the line number indicators 3-1 to 3-4 to indicate the attribute indicative of whether the display line is the substantial line or a null line.

As a constitution in which four or more displaying manners are realized, there can be mentioned a constitution in which an area for displaying a line number is provided in the character display area 2. Actually, a tape printing apparatus having this configuration exists.

However, when the constitution is adopted in which the line number displaying area is provided in the character display area 2, the display apparatus become large by the area corresponding to the line number displaying area. Therefore, this constitution cannot be applied to low-price tape printing apparatuses requiring a smaller size and a lower cost. To the contrary, when a constitution in which the line number displaying area is provided in the character display area 2, a problem arises that the number of displayed input characters is reduced, so that the usability of the tape printing apparatus is lowered.

The same problem occurs in seal making apparatuses in which the number of characters to be engraved on the seal face is limited.

SUMMARY OF THE INVENTION

The present invention is accomplished in view of the above-described problems.

It is therefore an object of the present invention is to provide a character display apparatus capable of displaying characters, such as numerals, can be displayed in any one of various displaying manners.

Another object of the present invention is to provide a character input apparatus capable of informing the user of various kinds of information as to each line of the character input string while keeping the display device neither complicated nor large-sized.

In order to achieve the above objects, a first aspect of the present invention provides a character display apparatus including (1) character display means having at least a character segment formed in the shape of a character, and a background segment which is provided in such a manner as to surround the character segment and constitutes a background of an outline character; and (2) display control means for performing on-off control of the character segment and the background segment.

Further, a second aspect of the present invention provides a character input apparatus including: (1) display means having a character display area in which a number of lines displayed in a display area is smaller than the maximum input allowable line number and the dot display method is employed, and a plurality of line number indicators each of which corresponds to each of the lines of the input allowable maximum line number and is adapted to display the line attribute of each line, such as an input state and a display state; and (2) display control means for controlling the display of the display means, wherein (3) each of the line number indicators comprises a numeral segment in the shape of a numeral indicative of a line number, and a background segment which is provided in such a manner as to surround the numeral segment and constitutes a background of an outline numeral; and (4) the display control means performs on-off control of the numeral segment and the background segment in accordance with an input state or display state of each line.

BRIEF DESCRIPTION OF THE DRAWINGS

Other features, objects and advantages of the present invention will become apparent from the following description of the preferred embodiments with reference to the drawings in which like reference characters designate like or corresponding parts throughout several views, and in which:

FIG. 4 is an explanatory view illustrating the displaying manner of the line number indicators;

FIG. 6 is an explanatory view illustrating the correspondence between the displaying manner of the line number indicator and the contents indicated by the line number indicator.

DETAILED DESCRIPTION OF THE INVENTION

Hereinafter, an example of a tape printing apparatus as an embodiment of a character input and display apparatus according to the present invention with reference to the attached drawings.

(A) Constitution of the Embodiment

First, referring to the functional block diagram in FIG. 3, an overall constitution of the tape printing apparatus according to the present embodiment will be described.

Figure 3:
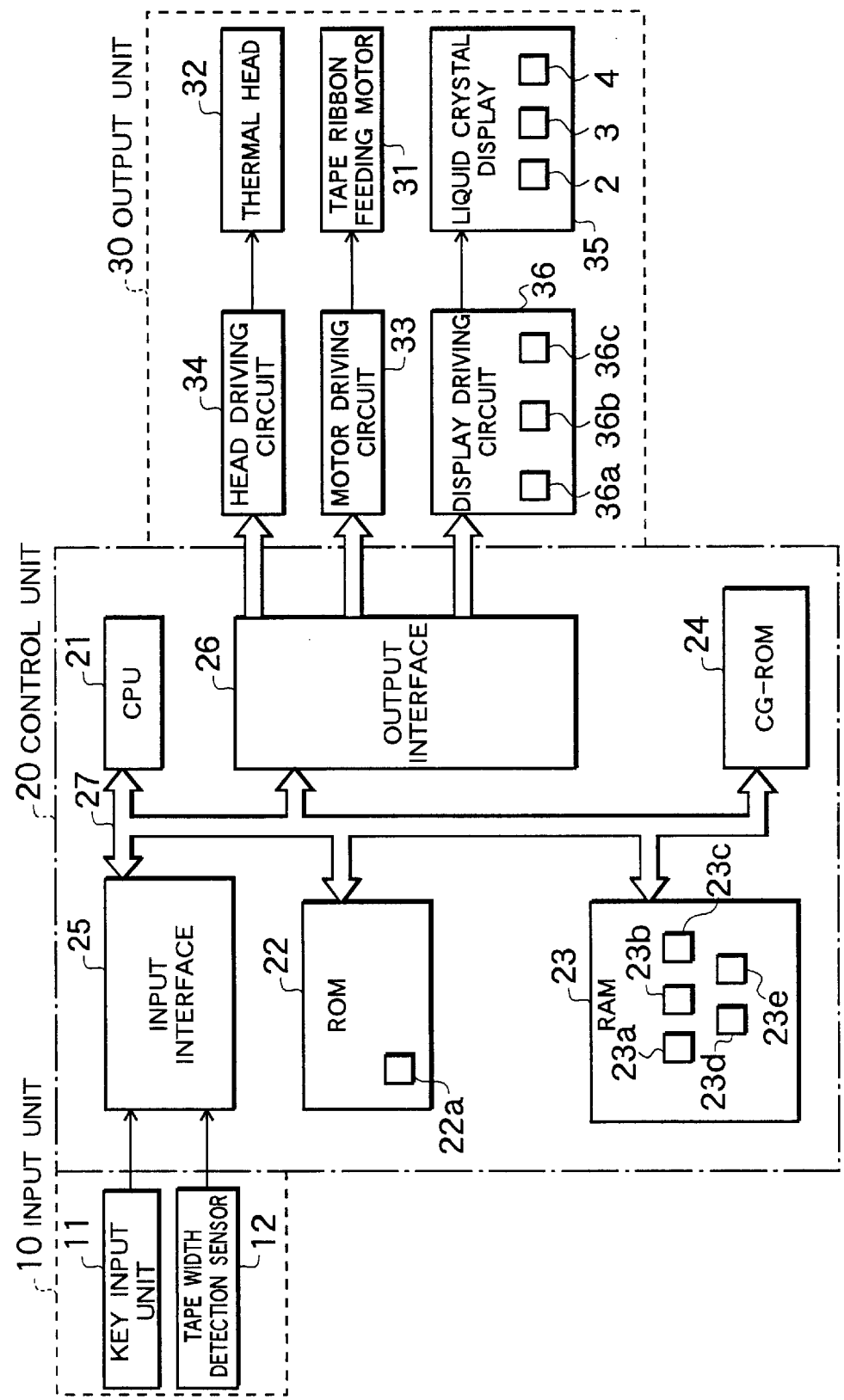
FIG. 3 is a block diagram of a constitution of electrical members.

As shown in FIG. 3, similarly to the other character printing apparatuses, the tape printing apparatus of the present embodiment roughly includes an input unit 10, a control unit 20, and an output unit 30. The control unit 20 is adapted to execute processing in accordance with information supplied via input unit 10, a processing stage at that time, and so on, and the result of the processing is outputted from the output unit 30 by way of display or print.

The input unit 10, while not detailed, includes a key input unit 11, which has a depressing key, a dial key and the like, and a tape width detection sensor 12. The key input unit 11 is adapted to generate character code data and various types of control data to be supplied to the control unit 20. The tape width detection sensor 12 is adapted to detect the width of the loaded tape and to supply tape width information to the control unit 20. In actual, detecting the tape width by the sensor 12 is conducted by reading a physical identification element (e.g., a hole) provided on a tape cartridge and representing the width of the tape accommodated in the tape cartridge.

The output unit 30 includes members serving as a print mechanism and members serving as a display mechanism.

The print mechanism includes a tape/ribbon feeding motor 31 and a thermal head 32. The tape/ribbon feeding motor 31 is adapted to feed a tape or an ink ribbon loaded in the tape printing apparatus (both not shown) to a predetermined printing position or to the outside of the tape printing apparatus. The tape/ribbon feeding motor 31 is constituted by a stepping motor, a DC motor, or the like. The thermal head 32 is, for example, fixed, and adapted to perform printing on the running tape by the thermal transferring method. The tape/ribbon feeding motor 31 is driven by a motor driving circuit 33, and the thermal head is driven by the head driving circuit 34, both driven under the control of the control unit 20. The tape on which printing is completed is cut, for example, by a cutter (not shown) which is operated by the user or driven by a motor.

Figure 2:
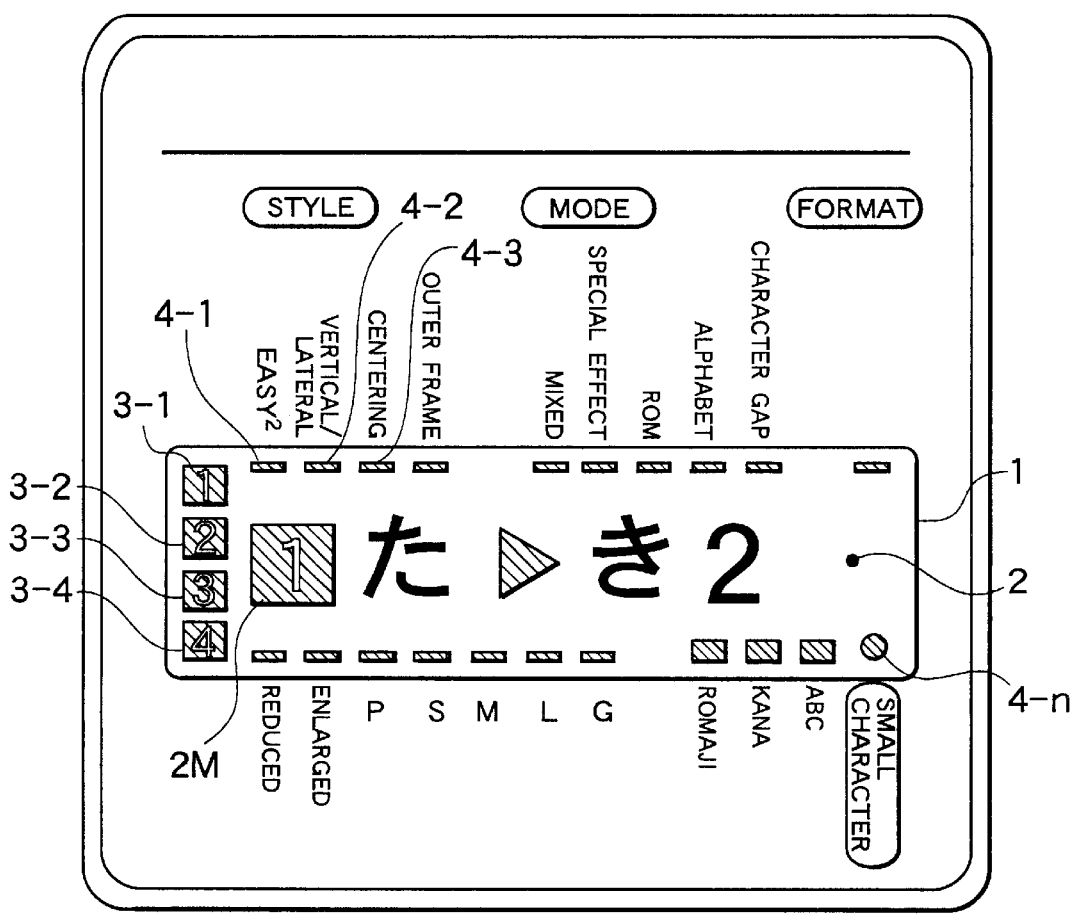
FIG. 2 is a plan view showing a constitution of a display surface employed in the apparatus of the embodiment and the conventional apparatus.

The display mechanism includes, for example, a liquid crystal display 35 which can display characters of a predetermined size arranged in a plurality of lines each having a plurality of characters. In this embodiment, the number of lines is one, and the number of characters in each line is six. The liquid crystal display 35 is driven by a display driving circuit 36 under the control of the control unit 20. In this embodiment, it is assumed that the number of lines of the input character string is four or smaller as shown in FIG. 2.

The display surface 1 of the liquid display unit 35 has substantially the same constitution as that of the liquid crystal display unit of the above-mentioned conventional tape printing apparatus.

Specifically, the display surface 1 of the liquid crystal display 35 includes a character display area 2, and line number indicators 3-1 to 3-4. The display surface also includes attribute indicators 4-1 to 4-n, which were not mentioned in the Discussion of the Related Art, each of which is adapted to indicate an attribute of the input character string. Each of the indicators 4-1 to 4-n, when it is in an on state, shows that an attribute associated with the indicator is adopted. The attribute of each indicator is denoted by the characters printed at a place lying in an area around the display surface 1 and beside the indicator. Examples of the attributes denoted by the indicators 4-1 to 4-n include those on character size, those on input mode (e.g., kana input mode, romaji input mode), those on a unit of a plurality of character strings (e.g., vertical writing, and centering), those on a unit of a character (special effect character, alphabetical style), and those on whether or each of the other formats is adopted or not.

It should be noted that, while in the present embodiment the number of lines of the character string displayed in the character display area 2 is one, the number of lines of the character string may be two or more.

As described above, the liquid crystal display 35 is constituted by the character display area 2, the line number indicator unit 3 (3-1 to 3-4), and the attribute indicator unit 4 (4-1 to 4-n). Accordingly, the display driving circuit 36 is also constituted by a driving unit 36a connected to the character display area 2, a driving unit 36b connected to the line number indicator unit 3 (3-1 to 3-4), and the driving unit 36c connected to the attribute indicator unit 4 (4-1 to 4-n)

In this embodiment, the constitution of the segments in each of the line number indicators 3-1 to 3-4, and the driving unit 36b connected thereto are different from conventional ones. In view of this, the constitution of the line number indicators 3-1 to 3-4 is first described.

FIGS. 1A to 1D shows the constitution of each of the line number indicators 3-1 to 3-4 according to this embodiment.

Figure 1A:
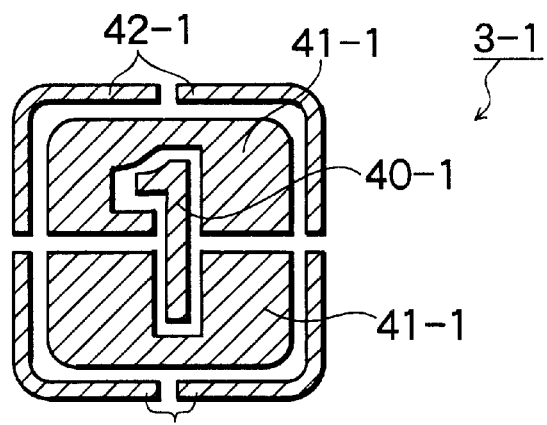
FIG. 1 is a plan view showing a constitution of a line number indicator of the embodiment.
Figure 1B:
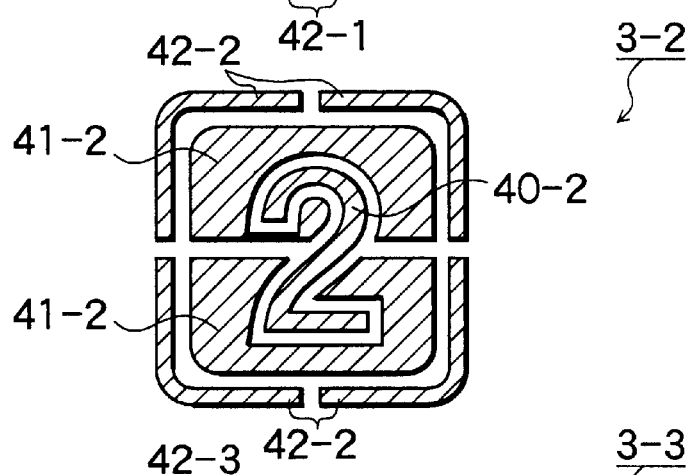
Figure 1C:
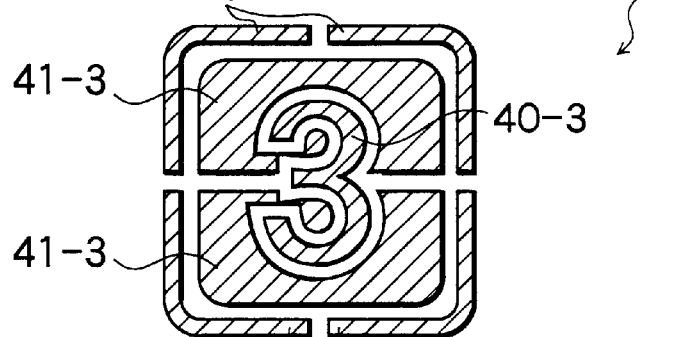
Figure 1D:
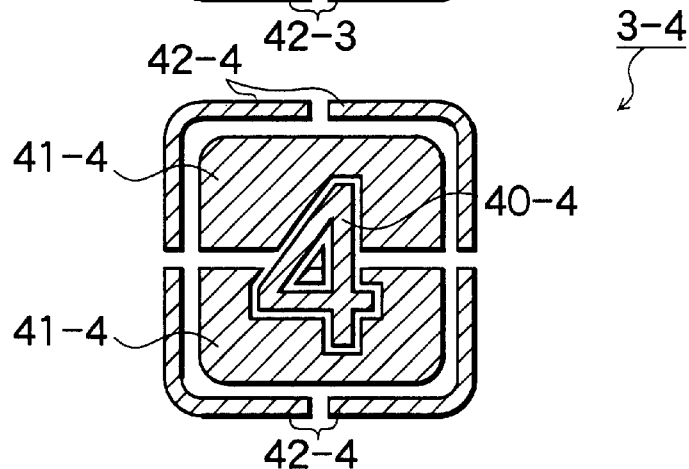

As shown in FIG. 1A, the line number indicator 3-1 is constituted by: a numeral segment 40-1, formed by one segment element, in the shape of a numeral; a background segment 41-1, formed by two segment elements, which is provided in such a manner as to surround the numeral segment 40-1 and forms a background of an outline numeral; and a frame segment 42-1, formed by four segment elements, which are provided in such a manner as to surround the background segments 41-1 and forms a substantially square frame surrounding the background of an outline numeral. The other line number indicators 3-2, 3-3 and 3-4 have the same constitution as that of the line number indicator 3-1, that is, are constituted by numeral segments 40-2, 40-3 and 40-4, background segments 41-2, 41-3 and 41-4, and frame segments 42-2, 42-3 and 42-4, respectively, as shown in FIGS. 1B, 1C and 1D. Thus, the line number indicators 3-1 to 3-4 of the present embodiment, which have an increased number of types of segments, are different from conventional line indicators which have about one or two segments forming an outline numeral.

In the present embodiment, the background segments 41-1 to 41-4 and the frame segments 42-1 to 42-4 are each formed by a plurality of segment elements for facilitating the wire arrangement of segment driving wires.

However, the numbers of the segment element are not limited thereto. Specifically, while each of the background segments 41-1 to 41-4 is formed by two segment element in the present embodiment, the number of segment element may be one, or three or more. Also, while each of the frame segment elements 42-1 to 42-4 is formed by four segment elements in the present embodiment, the number of segment elements may be one, or two or more.

Each of the numeral segments 40-i and the frame segments 42-i (i denotes any one of 1 to 4, and i's in 40-i and 42-i are the same) are connected to the same segment driving line (not shown) extending from the driving unit 36b connected to the line number indicator unit 3. Accordingly, the numeral segment 40-i and the frame segment 42-i assume the same on-off state. On the other hand, the background segment 41-i is connected to another segment driving line (not shown) extending from the driving unit 3Gb connected to the line number indicator unit 3.

Each of FIGS. 4A1 to 4D1 shows a display state of each of the line number indicators 3-1 to 3-4 in which the background segment 41-i is controlled to an on-state while both of the numeral segment 40-i and the frame segment 42-i are controlled to an off-state. On the other hand, each of FIGS. 4A2 to 4D2 shows a display state of each of the line number indicators 3-1 to 3-4 in which the background segment 41-i is controlled to an off-state while both of the numeral segment 40-i and the frame segment 42-i are controlled to an on-state.

It should be noted that, when all of the numeral segment 40-i, the background segment 41-i, and the frame segment 42-i are controlled to the off-state, each of the line number indicators is brought into a state in which the indicator cannot be seen (that is, in the state in which the indicator is not displayed). When all of the numeral segment 40-i, the background segment 41-i, and the frame segment 42-i are controlled to the on-state (see FIGS. 1A to 1D), the numeral written on the indictor is not distinctively displayed, so that this display state is not used in this embodiment.

Owing to the above constitution in display state of the line number indicators 3-1 to 3-4 in this embodiment, each of the line number indicators 3-1 to 3-4 assumes any one of six display states: a negative light-on display state in which the manner shown in each of FIGS. 4A1 to 4D1 continues; a negative blinking display state in which the manner shown in each of FIGS. 4A1 to 4D1 and a light-off manner is cyclically repeated; a positive light-on display state in which the manner shown in each of FIGS. 4A2 to 4D2 continues; a positive blinking display state in which the manner shown in each of FIGS. 4A2 to 4D2 and a light-off manner is cyclically repeated; a light-off display state in which all of the segments are controlled to the off-state; and a negative-positive blinking display state in which the manner shown in each of FIGS. 4A1 to 4D1 and each of the states shown in FIGS. 4A2 to 4D2 are cyclically repeated.

The cyclic repetition of the displaying manners performed in the negative blinking display state, the positive blinking display state and the negative-positive blinking display state is controlled by, for example, a built-in hardware timer incorporated in the driving unit 36b in the present embodiment. However, the cyclic repetition may be controlled by software.

Next, returning to FIG. 3, the constituting members other than the line number indicators 3-1 to 3-2 will be described.

The control unit 20 includes a CPU 21, a ROM 22, a RAM 23, a character generator ROM (CG-ROM) 24, an input interface 25 and an output interface 26, which are connected to one another via a system bus 27. The control unit is constituted by, for example, a microcomputer.

The ROM 22 stores fixed data, including various kinds of processing programs, a kana-kanji conversion dictionary, and the like. An input processing program 22a shown in FIG. 5, in which processing of controlling the line number indicators 3-1 to 3-4 is performed, is included in the various kinds of processing programs stored in the ROM 22 as the fixed data.

The RAM 23 is used as a working memory which stores data or the like input by the user, and the like. The constituting member denoted as the RAM 23 in FIG. 3 is not limited to random access memories so long as the member serves as a working memory. Therefore, the member may be electrically erasable and programmable ROM (EEPROM) or other memory elements. The RAM 23 contains: a printing buffer 23a, in which the character string to be printed is developed in the form of dots and the data thus developed is stored; a display buffer 23b for storing displayed image associated with the character string and so on; a text buffer 23c for storing character data associated with printing or input, and so on; a line-number-indicator state holding buffer 23d for storing display states of the line number indicators 3-1 to 3-4; and an attribute indicator state holding buffer 23e for storing the display states of the attribute indicators 4-1 to 4-n.

In the display buffer 23b, the input character is developed into dot patterns, and the dot pattern thus obtained is supplied to the driving unit 36a connected to the character display area 2, so that the dot pattern is displayed in the character display area 2. The contents stored in the line-number-indicator state holding buffer 23d is supplied to the driving unit 36b connected to the line number indicator unit 3 (3-1 to 3-4), so that each of the line number indicators 3-1 to 3-4 is displayed in a display state determined in accordance with the contents thus supplied. Further, the contents stored in the attribute indicator state holding buffer 23e is supplied to the driving unit 36c connected to the attribute indicator unit 4 (4-1 to 4-n) so that each of the attribute number indicators 4-1 to 4-n are displayed in the display state determined in accordance with the contents thus supplied.

Instead of employing the constitution containing the line-number-indicator state holding buffer 23d and the attribute-indicator state holding buffer 23e, a constitution in which the CPU 21 directly controls the driving units 36b and 36c may be employed.

The CG-ROM 24 stores dot patterns of the characters or symbols provided within the tape printing apparatus, and outputs, when code data which specifies a letter or symbol are supplied, a dot pattern corresponding thereto. The CG-ROM 24 may be in the form of separate two types of CG-ROMs each dedicated to a display purpose and to a printing purpose. The dot pattern stored in the CG-ROM 24 may be either of outline font and bitmap font.

The input interface 25 is adapted to interface between the input unit 10 and the control unit 20. The output interface 26 is adapted to interface between the output unit 30 and the control unit 20.

The CPU 21 is adapted to execute a processing program stored in the ROM 22 that is determined in accordance with an input signal sent from the input unit 10 and a processing stage at that time while utilizing the RAM 23 as a working area or, if necessary, by appropriately using fixed data stored in the ROM 22 or RAM 23. Also, the CPU 21 is adapted to cause the liquid crystal display 35 to display the state or result of the processing and so on, or to cause the state or result of the processing to be printed on a tape (not shown)

(B) Operation of the Embodiment

Figure 5:
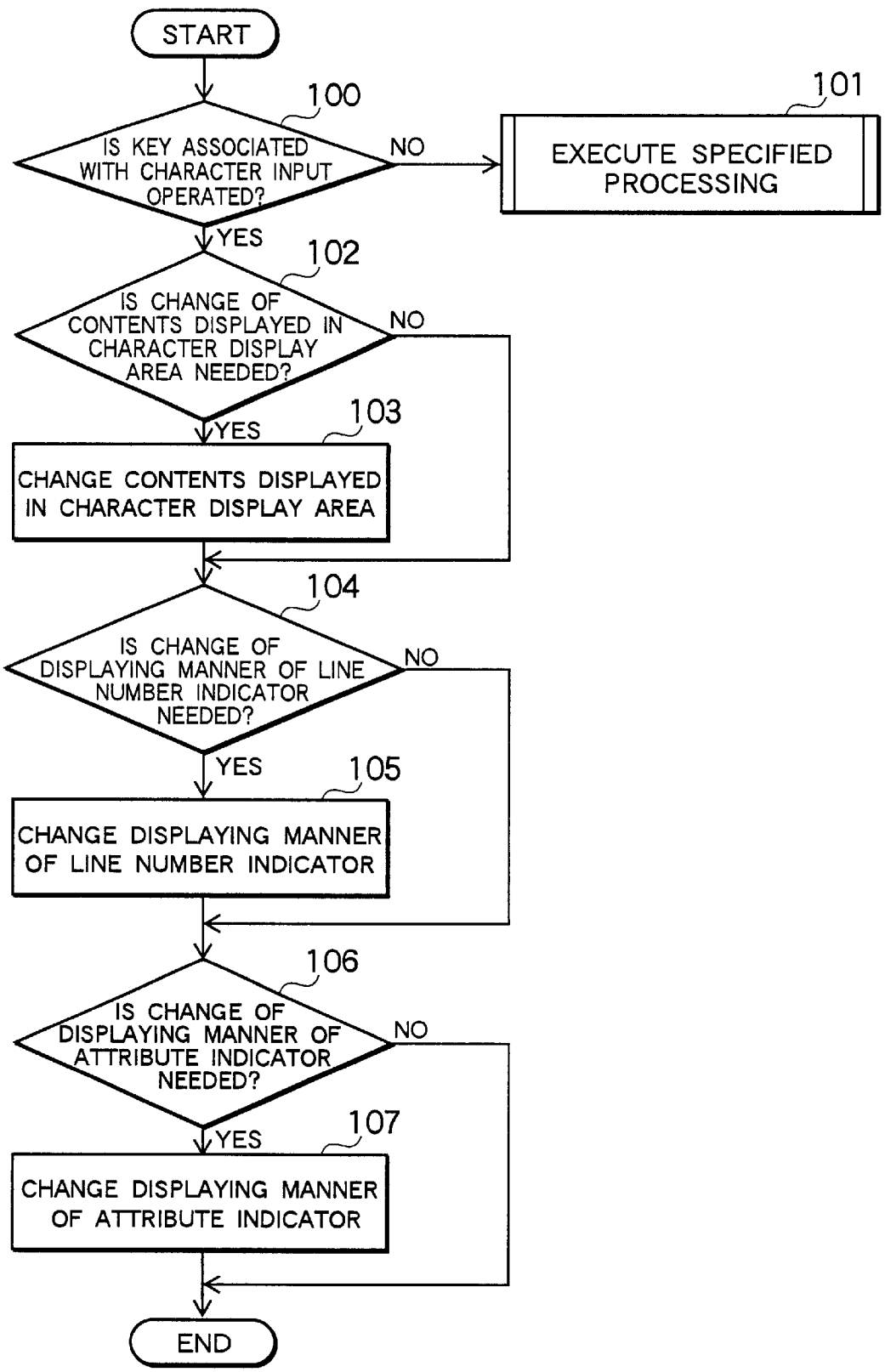
FIG. 5 is a flowchart showing the processing conducted in the case where the key information is inputted.

Hereinafter, operation of the embodiment, in particular processing in accordance with the input processing program 22a performed by the CPU 21 when information is supplied to the CPU 21 by operating a key provided in the key input unit 11 will be detailed with reference to FIG. 5. FIG. 5 shows the processing performed when a piece of key information (that is, information produced by operating a key) is supplied, that is, when information is supplied by operating one key.

When the key information is supplied from the key input unit 11, the CPU 21 judges whether a key associated with input or editing of character string (step 100). If it is judged at step 100 that the operated key is not associated with input or editing of character string, processing in accordance with the key information is performed (step 101). For example, if the operated key is a print key or layout display key, which is not associated with input of character string, print processing or layout display processing is executed, respectively.

When a key associated with input or editing of character string, it is checked whether it is necessary to change the displaying manner with respect to the character display area 2, the line number indicators 3-1 to 3-4, and the attribute indicators 4-1 to 4-n, in this order (steps 102 to 107).

More particularly, if it is judged that it is necessary to change the contents displayed in the character display area 2, the change of the contents displayed in the character display area 2 (steps 102 to 103) is executed. When character string input operations are performed, in many cases, it becomes necessary to change the contents displayed in the character display area. Specifically, when a character key is operated, the displayed contents need to be changed, not to mention. In addition, when the cursor moving key, the deletion key or the slewing key is operated, the displayed contents also need to be changed. As a case where the displayed contents does not need to be changed, the case where a key for changing input modes is operated (for example, the case where a key for changing kana input mode to a romaji input mode is operated) or the like cases can be mentioned.

Changing the contents displayed in the character display area 2 is performed by developing the picture image of the character string or the like associated with the key operation into a dot pattern in the display buffer 23b, and supplying the dot pattern thus obtained to the driving unit 36a connected to the character display area 2 so as to drive the driving unit 36a.

After the processing of changing the contents displayed in the character display area 2 is completed, or after it is judged that it is not necessary to change the contents in the character display area 2, judgment is made as to whether or not it is necessary to change the displaying manner of the line number indicators 3-1 to 3-4 (step 104). When it is judged that it is necessary to change the displaying manner of the line number indicators 3-1 to 3-4, the displaying manner of the line number indicators 3-1 to 3-4 is changed (step 105). Such a change is needed: in a case where the line displayed at the character display area 2 is changed by operating the slewing key or a cursor moving key; in a case where the state in which no determined character exists in the character display area 2 is changed to the state in which determined character exists, the latter state being brought, for example, by changing an undetermined hiragana or kanji is to its determined hiragana or kanji; or in the like cases.

It should be noted that all of the line number indicators 3-1 to 3-4 are made in the light-off display state in the case where the contents displayed in the character display area 2 is not the input character string, while processing steps therefor are not shown in the flowchart in FIG. 5, in the case where eligible kanjis are displayed in kana-kanji conversion processing, in the case where a message (character string) inquiring the user of which character he wishes to choose is displayed, or in the like cases. Accordingly, also in such cases, changing the displaying manners of the line number indicators 3-1 to 3-4 may be performed.

Changing the contents displayed in the line number indicators 3-1 to 3-4 are conducted by: changing the contents stored in the line-number-indicator state holding buffer 23d; supplying the contents thus changed stored in the line-number-indicator state holding buffer 23d to the driving unit 36b connected to the line number indicator unit 3 (3-1 to 3-4); and controlling an associated segment or segments (the pair of the numeral segment and the frame segment, or the background segment) in each of the line number indicators 3-1 to 3-4 in accordance with the contents thus supplied in such manner that the segment is turned into an on state (on control), into a blinking state (control of repeating switching between on-state and off-state, or repeated switching on-state segments), or into an off-state (off control).

After the processing of changing the displaying manners of the line indicators 3-1 to 3-4, or after it is judged that it is not necessary to change the contents in the character display area 2, judgment is made as to whether or not it is necessary to change the displaying manners of the attribute indicators 4-1 to 4-n (step 106) When it is judged at step 106 that it is necessary to change the displaying manners of the attribute indicators 4-1 to 4-n, processing of changing the displaying manners of the attribute indicators 4-1 to 4-n is performed (step 107). Such a change is needed in the case where the input mode is changed from kana input mode to romaji input mode, or in the case where the character size of the character indicated by the cursor is changed by operating a cursor moving key.

Changing the displaying manners of the attribute indicators 4-1 to 4-n is performed by: changing the contents stored in the attribute-indicator state holding buffer 23e; supplying the stored contents thus changed to the driving unit 36c connected to the attribute indicator unit 4 (4-1 to 4-n); and causing the attribute indictors 4-1 to 4-n to be turned on or off in accordance with the contents thus supplied.

FIG. 6 is a table containing the displaying manners of the line number indicators 3-i and their meanings in the present embodiment. The CPU controls the displaying manners of each line number indicator 3-i so that the displaying manner may properly indicate the current state of each line.

As shown in FIG. 6, (1) "negative light-on display state" means that the line indicated by the indicator is not the line displayed in the character display area 2 and that the line indicated by the indicator contains a determined character; (2) "negative blinking display state" means that the line indicated by the indicator is the line displayed in the character display area 2 and that the line indicated by the indicator contains a determined character; (3) "positive light-on display state" means that the line indicated by the indicator is not the line displayed in the character display area 2 and that the line indicated by the indicator and the subsequent lines contain no determined character; (4) "positive blinking display state" means that the line indicated by the indicator is the line displayed in the character display area 2 and that the line indicated by the indicator and the subsequent lines contain no determined character; and (5) "light-off display state" means that the line does not constitute a character string. It should be noted that (6) "negative-positive blinking display state" is not adopted as the displaying manner of the line number indicators 3-1 to 3-4 in the present embodiment.

Not to mention, the correspondence between the is playing manners of the line number indicators 3-1 to 3-4 and their meanings are not limited to those shown in FIG. 6.

Next, referring to FIGS. 7A to 7F, how the displaying manners of the line number indicators 3-1 to 3-4 change in accompaniment with the change in the input state and/or display state by employing a specific input character string as an example. In FIGS. 7A to 7F, the attribute indicators 4-1 to 4-n are not shown. FIGS. 7A to 7F show a case where the fixed cursor displaying method is employed in which the cursor (vertical cursor) is displayed basically at the sixth display position in the character display area 2 in a fixed manner. The numeral appearing in the character display area 2 is a line head mark.

Figure 7A:
FIG. 7 is an explanatory view showing how the display state of the line number indicator changes.

FIG. 7A shows the initial display state, that is, the state assumed before character is inputted. In this state, there is no input character string, but the line displayed at the character display area 2 will become, when an input character string is determined, the first line of the input character string. Also, there is no determined character, not to mention. Accordingly, the line number indicator 3-1 associated with the first line assumes the positive blinking display state, which represents that the line is the display line having no determined character (see item (4) in FIG. 6), and each of the other line number indicators 3-2 to 3-4 assumes the light-off display state (that is, in the invisible state), which represents that the line is not included in the input character string (see item (5) in FIG. 6)

In the display state shown in FIG. 7A, when a character "A" is inputted in the state shown in FIG. 7A, the display state 7B is brought about. In the state shown in FIG. 7B, the display line is the first line in the input character string, as in the state shown in FIG. 7A. However, in the state shown in FIG. 7B, unlike the state shown in FIG. 7A, there is a determined character. Accordingly, the line number indicator 3-1 associated with the first line of the character string assumes the negative blinking display state, which represents a display line having a determined character (see item (2) in FIG. 6). The other line number indicators 3-2 to 3-4 assume the light-off display state (see item (5) in FIG. 6) as shown in FIG. 7B.

Figure 7B:

In the display state shown in FIG. 7B, when the slewing key is operated, the display line is changed from the first line to the second line. Not to mention, after the change of the display line, the second line contains no determined character. Accordingly, the line number indicator 3-2 associated with the second line comes to assume the positive blinking display state, which represents a display line containing no determined character (see item (4) in FIG. 6). On the other hand, the first line of the input character string is no longer the display line while the first line contains the determined character. Accordingly, the line number indicator 3-1 associated with the first line of the input character string comes to assume the negative light-on display state, which represents that the indicated line is not a display line and contains a determined character (see item (1) in FIG. 6). Each of the other line number indicators 3-3 and 3-4 remains to be in the light-off display state (see item (5) in FIG. 6).

Figure 7C:
Figure 7D:
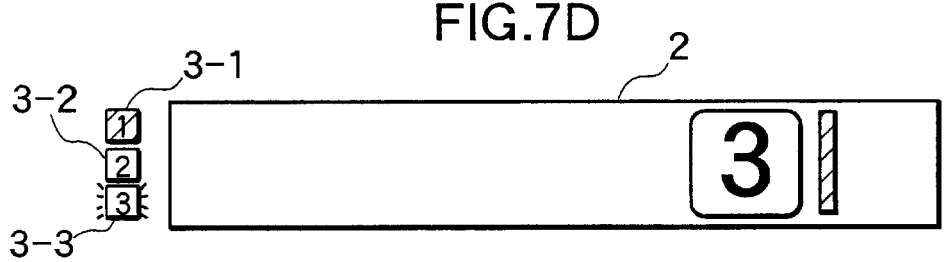

In the display state shown in FIG. 7C, when the slewing key is operated, the display line is changed from the second line to the third line as shown in FIG. 7D. Not to mention, after the change of the display line, the third line contains no determined character. Accordingly, the line number indicator 3-3 associated with the third line of the character string comes to assume the positive blinking display state, which represents the display line containing no determined character (see item (4) in FIG. 6). Since the slewing operation of this time does not affect the first line, the line number indicator 3-1 remains to be in the negative light-on display state (see item (1) in FIG. 6) as shown FIG. 7D. On the other hand, after the stewing operation is executed, the slewing operation is performed under the state that no determined character exists, the second line becomes a null line, that is, the second and subsequent lines contain no determined character. Accordingly, the displaying manner of the line number indicator 3-2 associated with the second line is changed to the positive light-on display state, which represents that the indicated line is not the display line and the indicated and subsequent lines contain no determined characters (see item (3) in FIG. 6), as shown in FIG. 7D. The remaining line number indicator 3-4 remains to be in the light-off display state (see item (5) in FIG. 6).

Figure 7E:
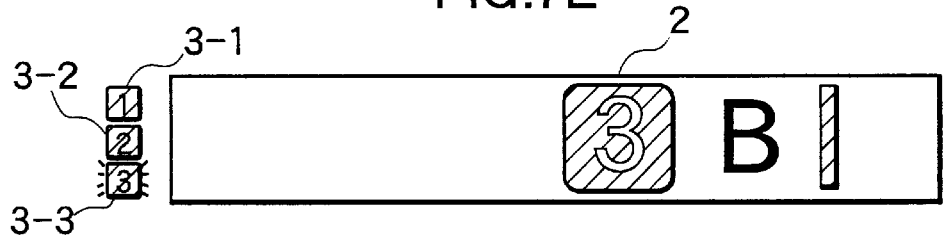

In the display state shown in FIG. 7D, when the character "B"is input, the state shown in FIG. 7E is brought about. In the state shown in FIG. 7E, after the alphabetic character determination operation, the third line of the input character string still remains to be the third line, but the third line is changed to a line containing a determined character. Accordingly, the line number indicator 3-3 associated with the third line comes to assume the negative blinking display state (see item (2) in FIG. 6). In the alphabetic character determining operation, no character is input to the second line, but a determined character is generated in the second or subsequent lines, that is, the second line is changed from a null line to a substantial line, and the display state of the line number indicator 3-2 associated with the second line is changed to the negative light-on display state (see item (1) in FIG. 6). Further, the alphabetic character determining operation does not affect the first line, the line number indicator 3-1 associated with the first line remains in the negative light-on display state (see item (1) in FIG. 6). The other line number indicator 3-4 remains in the light-off display state (see item (5) in FIG. 6).

Figure 7F:

In the display state shown in FIG. 7E, the characters "CDEFG" are inputted at the positions after the character "B", the state shown in FIG. 7F is brought about. In the state shown in FIG. 7F, the characters "CDEFG" are displayed in the character display area as shown in FIG. 7F, and accordingly the line head mark and the character "B" comes not to be displayed. Thus, the characters shown in the character display area 2 is changed, but the line attribute itself of the third line is not changed. Accordingly, the display states of the line number indicators 3-1 to 3-4 in FIG. 7F are not changed from FIG. 7E.

In the display state shown in FIG. 7F, since the line head mark disappears, and therefore the user cannot know from the line head mark that the display line is the third line. However, since the line number indicator 3-3 associated with the third line is in the negative blinking state representing that the indicated line is the display line containing a determined character (see item (2) in FIG. 6), the user can know that the display line is the third line.

Thus, in the present embodiment, since the number of the displaying manners of each of the line number indicators 3-1 to 3-4 is increased, the line attribute can be denoted only by the displaying manner of the line number indicators 3-1 to 3-4, that is, without providing display area in the character display area 2. As a result, it becomes possible to cause the character display area 2 to display as many characters as the maximum allowable number of the character display area 2.

(C) Advantages of the Embodiment

As described above, according to the abovedescribed embodiment, since the segments in each of the line number indicators is constituted as shown in FIGS. 1A to 1D, the number of displaying manners of each line number indicator is increased. Accordingly, various kinds of information as to line attributes can be notified to the user only by means of the line number indicator having the above-described constitution (that is, without providing a line number indicator having a segment configuration employing a dot display method). Consequently, the usability of the tape printing apparatus is greatly enhanced compared with the conventional apparatus while preventing the apparatus from becoming complicated or large-sized.

(D) Other Embodiments

Although the preferred embodiments of the present invention have been described above, it should be understood that the present invention is not limited thereto and that other embodiments will be apparent to those skilled in the art without departing from the spirit of the invention.

For example, in the above-mentioned embodiment, the line number indicator has a frame segment, but the frame segment may be omitted.

In the above-mentioned embodiment, the constitution including the character segment (including numeral segment) and the background segment is applied to the line number indicator. However, this constitution may be applied to the other types of indicators, for example, to an indicator for indicating a character size (e.g. medium size, reduced size, and enlarged size). As an example of the case where the constitution is applied to an indicator for indicating a character size, the following can be mentioned. Specifically, the character segment is constituted by a character "M" representing a medium size character, and the background segment is provided in such a manner as to surround the character segment. As the meanings of the respective displaying manners, the negative light-on display state represents a medium size, which is the inherent meaning of the character "M", the positive blinking display state represents a reduced size, the negative blinking state represents an enlarged size, and the light-off display state represents no character size. In the case where the character sizes are represented by the indicator of this constitution, it becomes unnecessary to provide the character size indicators, each specially provided for indicating a medium size, a reduced size or an enlarged size, as shown in FIG. 2, becomes unnecessary.

Further, in the above-mentioned embodiment, the present invention is applied to the tape printing apparatus, but it can be applied to other apparatuses which has limitation on the number of lines of the input character string, such as a seal making apparatus or the like.

Further, the constitution of the above-mentioned embodiment in which at least a character segment and a background segment are provided and adapted to display characters can be applied to a character display apparatus, as well as to an indicator. For example, the constitution can be applied to an advertisement lamp or the like.

Further, in the above-mentioned embodiment, the character segment and the background segment are each constituted by a liquid crystal. However, the segments may be constituted, not to mention, by the other display materials. Further, the characters represented by the segments are not restricted to the alphabets and numerals.

(E) Advantages of the Invention

According to the first aspect of the present invention, since (1) character display means having at least a character segment formed in the shape of a character, and a background segment which is provided in such a manner as to surround the character segment and constitutes a background of an outline character; and (2) display control means for performing on-off control of the character segment and the background segment, various displaying manner of a specific character can be realized by a simple constitution without employing the dot display method constitution.

According to the second aspect of the present invention, in the display means having a character display area and the line number indicator, (1) each of the line number indicators comprises a numeral segment in the shape of a numeral indicative of a line number, and a background segment which is provided in such a manner as to surround the numeral segment and constitutes a background of an outline numeral; and (2) the display control means performs on-off control of each of the numeral segment and the background segment in accordance with an input state or a display state of each line. Owing to this constitution, various types of displaying manner can be taken without employing the segment configuration in accordance with the dot display method, so that the apparatus can inform the user of various types of information through the line number indicator. Accordingly, the usability of the apparatus is greatly enhanced without making the apparatus complicated or large-sized.

It should be noted that, since the present invention is not limited to the above-described embodiments and modifications, the scope of the invention is to be determined solely by the appended claims.

What is claimed is:

1. A character input apparatus comprising:

display means having (a) a character display area in which a number of lines displayed in a display area is smaller than a maximum number of allowable input lines and a dot display method is employed, and (b) a plurality of line number indicators each corresponding to a respective line of the maximum number of allowable input lines and adapted to display line attributes of the respective line, such as an input state and a display state; and display control means for controlling the display means, wherein each of the line number indicators comprises a numeral segment in the shape of a numeral indicating the respective line, and a background segment surrounding the numeral segment and forming an outline of the numeral segment; and the display control means performs on-off control of the plurality of numeral segments and the plurality of background segments to indicate an input state and a display state of each line.

2. The character input apparatus according to claim 1, wherein the input state indicated by each of the line number indicators include a state as to whether or not the line indicated by the line number indicator contains a determined character, and the display state includes a state as to whether or not the line indicated by the line number indicator is displayed at the character display area.

3. The character input apparatus according to claim 1, wherein each of the line number indicators further comprises a frame segment surrounding the background segment; and the display control means performs on-off control in such a manner that the frame segment and the numeral segment exhibit the same on-off state.

4. The character input apparatus according to claim 2, wherein each of the line number indicators further comprises a frame segment surrounding the background segment; and the display control means performs on-off control in such a manner that the frame segment and the numeral segment exhibit the same on-off state.

5. The character input apparatus according to claim 2 wherein the display state comprises a blinking state of the numeral segment or the background segment of each line number indicator to indicate that the line indicated by each line number indicator is displayed in the display area.

6. The character input apparatus according to claim 2 wherein the input state comprises (a) an on-state of the numeral segment and an off-state of the background segment indicating absence of a determined character in the line indicated by each line number indicator, and (b) an off-state of the numeral segment and an on-state of the background segment indicating presence of a determined character in the line indicated by each line number indicator.

7. The character input apparatus according to claim 5 wherein the input state comprises an on-state of the numeral segment and an off-state of the background segment indicating absence of a determined character in the line indicated by each line number indicator, and an off-state of the numeral segment and an on-state of the background segment indicating presence of a determined character in the line indicated by each line number indicator.

8. The character input apparatus according to claim 3 wherein each background segment has a rectangular periphery and each frame segment forms a rectangular frame extending around the rectangular periphery of the corresponding background segment.

9. The character input apparatus according to claim 4 wherein each background segment has a rectangular periphery and each frame segment forms a rectangular frame extending around the rectangular periphery of the corresponding background segment.

* * * * *